US009831503B2

(12) United States Patent
Sopchak

(10) Patent No.: US 9,831,503 B2
(45) Date of Patent: Nov. 28, 2017

(54) ELECTRODES AND ELECTROCHEMICAL DEVICES AND METHODS OF MAKING ELECTRODES AND ELECTROCHEMICAL DEVICES

(71) Applicant: Coulombic, Inc., Oakland, CA (US)

(72) Inventor: David Andrew Sopchak, Oakland, CA (US)

(73) Assignee: COULOMBIC, INC., Oakland, CA (US)

( * ) Notice: Subject to any disclaimer, the term of this patent is extended or adjusted under 35 U.S.C. 154(b) by 0 days.

(21) Appl. No.: 14/952,565

(22) Filed: Nov. 25, 2015

(65) Prior Publication Data

US 2016/0164106 A1    Jun. 9, 2016

Related U.S. Application Data

(60) Provisional application No. 62/086,717, filed on Dec. 3, 2014.

(51) Int. Cl.
  *H01M 4/86*    (2006.01)
  *H01M 4/90*    (2006.01)
  *H01M 12/08*   (2006.01)

(52) U.S. Cl.
  CPC ....... *H01M 4/8673* (2013.01); *H01M 4/8605* (2013.01); *H01M 4/8663* (2013.01); *H01M 4/9016* (2013.01); *H01M 12/08* (2013.01); *H01M 2004/8689* (2013.01); *Y02E 60/128* (2013.01)

(58) Field of Classification Search
  None
  See application file for complete search history.

(56) References Cited

U.S. PATENT DOCUMENTS

| | | | |
|---|---|---|---|
| 3,915,745 A | * | 10/1975 | Ikeda ............... H01M 10/42 429/406 |
| 4,551,220 A | | 11/1985 | Oda et al. |
| 5,242,765 A | | 9/1993 | Naimer et al. |
| 5,618,392 A | | 4/1997 | Furuya |
| 5,624,718 A | | 4/1997 | Dearnaley |

(Continued)

FOREIGN PATENT DOCUMENTS

| | | |
|---|---|---|
| JP | 2001-348296 | 12/2001 |
| JP | 2004-119019 | 4/2004 |

(Continued)

OTHER PUBLICATIONS

International Search Report and Written Opinion from PCT Application No. PCT/US2015/062744 dated Feb. 3, 2016.

(Continued)

*Primary Examiner* — Miriam Stagg
*Assistant Examiner* — Wyatt McConnell
(74) *Attorney, Agent, or Firm* — DLA Piper LLP US

(57) ABSTRACT

Dual use gas diffusion-gas evolution electrodes containing diamond-like carbon are described, which can act as gas diffusion electrodes during discharge, and gas evolution electrodes during recharge. Electrodes of the disclosed materials are electrochemically robust, inhibit multi-step reactions, and have high, isotropic thermal conductivity. The disclosed electrodes can be used as air electrodes of rechargeable metal-air batteries.

19 Claims, 7 Drawing Sheets

(56) References Cited

U.S. PATENT DOCUMENTS

| | | | |
|---|---|---|---|
| 6,607,642 B1 * | 8/2003 | Kiesele | G01N 27/308 204/412 |
| 7,033,691 B2 | 4/2006 | Mardilovich et al. | |
| 7,045,234 B2 | 5/2006 | Mardilovich et al. | |
| 7,348,087 B2 | 3/2008 | Kearl et al. | |
| 7,352,584 B1 | 4/2008 | Sung | |
| 7,463,917 B2 | 12/2008 | Martinez | |
| 7,981,560 B2 | 7/2011 | Kearl et al. | |
| 2005/0109262 A1 | 5/2005 | Linares et al. | |
| 2006/0261349 A1 | 11/2006 | Doering et al. | |
| 2009/0173015 A1 | 7/2009 | Keshavan et al. | |
| 2009/0176148 A1 | 7/2009 | Jiang et al. | |
| 2009/0258255 A1 | 10/2009 | Terashima et al. | |
| 2011/0183232 A1 | 7/2011 | Tsou et al. | |
| 2012/0097458 A1 | 4/2012 | Voronin et al. | |
| 2013/0280625 A1 | 10/2013 | Shimamune et al. | |

FOREIGN PATENT DOCUMENTS

| | | |
|---|---|---|
| WO | WO 00/74637 | 12/2000 |
| WO | WO 03/077333 | 9/2003 |
| WO | WO 2014/013433 | 1/2014 |

OTHER PUBLICATIONS

Kim, Electrochemical Properties of Graphite-based Electrodes for Redox Flow Batteries, Bull. Korean Chem. Society, No. 2, 2011, vol. 32, pp. 571-575.

English Abstract of JP 2001-348296 published Dec. 18, 2001.

English Abstract of JP 2004-119019 published Apr. 15, 2004.

Wen et al., Air Electrode for the Lithium-Air Batteries: Materials and Structure Designs, ChemPlusChem Reviews, 2015, 80, pp. 270-287.

Liang et al., A stable electrolyte makes a nonaqueous Li—$O_2$ battery truly rechargeable, New J. Chem., 2013, 37, pp. 2568-2572.

Kato et al., Diamond foam electrodes for electrochemical applications, Electrochemistry Communications, 2013, 33, pp. 88-91.

Wang et al., To draw an air electrode of a Li-air battery by pencil, Energy Environ. Sci., 2011, 4, pp. 1704-1707.

Yoo et al., Fe phthalocyanine supported by graphene nanosheet as catalyst in Li-air Batter with the hybrid electrolyte, Journal of Power Sources, 2013, 244, pp. 429-434.

Yang et al., Nanostructured Diamond Like Carbon Thin Film Electrodes for Lithium Air Batteries, Journal of the Electrochemical Society, 2011, 158(10), pp. B1211-B1216.

Li et al., $MnO_2$ nanoflakes coated on multi-walled carbon nanotubes for rechargeable lithium-air batteries, Electrochemistry Communication, 2011, 13, pp. 698-700.

Ein-Eli et al., Rechargeable Lithium-Air Batteries . . . Fame or Shame? Are Lithium-Air Batteries Overhyped?, Department of Materials Science and Engineering, Technion—Israel Institute of Technology, Haifa 3200003 Israel, pp. 1-41.

Li et al., Nitrogen-doped carbon nanotubes as cathode for lithium-air batteries, Electrochemistry Communications, 2011, 13, pp. 668-672.

Akhtar et al., Prospects, challenges, and Latest developments in lithium-air batteries, Int. J. Energy Res., 2015, 39, pp. 303-316. Also published online Jul. 14, 2014 in Wiley Online Library (wileyonlinelibrary.com).

Peng et al., A Reversible and Higher-Rate Li-$O_2$ Battery, Science, Aug. 3, 2012, vol. 337, pp. 563-566.

Peled et al., Sodium-Air Batteries for EV Applications, School of Chemistry Tel Aviv University, Tel Aviv, Israel, 3rd Israeli Power Sources Con. May 29-30, 2013, Herzelia, Israel, pp. 1-39.

Ohkuma et al., Stability of carbon electrodes for aqueous lithium-air secondary batteries, Journal of Power Sources, 2014, 245, pp. 947-952.

Grande et al., The Lithium/Air Battery: Still an Emerging Sytem or a Practical Reality?, Adv. Mater. 2015, 27, pp. 784-800.

Beyer et al., Thermal and electrochemical decomposition of lithium peroxide in non-catalyzed carbon cathodes for Li-air batteries, Phys. Chem. Chem. Phys., 2013, 15, pp. 11025-11037.

Krall, Diamonox Model 40, Advanced Diamond Technologies, Inc., 2012, pp. 1-14.

\* cited by examiner

ELECTRODES AND ELECTROCHEMICAL DEVICES AND METHODS OF MAKING ELECTRODES AND ELECTROCHEMICAL DEVICES

RELATED APPLICATIONS

This application claims priority to U.S. Provisional Patent Application Ser. No. 62/086,717 filed Dec. 3, 2014, currently pending.

BACKGROUND

Metal-air batteries, particularly lithium-air, are considered a tantalizing goal in battery research. Use of atmospheric oxygen as one of the reactants in a primary or secondary battery would allow many benefits. These include much greater practical energy density, increased safety when fully charged, and reduced need for raw materials in manufacture.

However, to date, no technology has adequately addressed the major problems of metal-air batteries specifically, the air electrode. The reduction of atmospheric oxygen at ambient temperatures may result in partial reduction products, such as peroxides, superoxides, peroxyl radicals, and/or hydroxyl radicals, that may damage other components of the battery. The overpotential required to overcome the sluggish kinetics of the reaction may result in some of the battery's stored energy being released as heat, which is a practical as well as a safety consideration. Recharging such a cell may be even more problematic. In contrast to discharge, the overpotential required to affect the oxidation of, for example, peroxide on recharge may bring the electrode to higher, more damaging potentials.

Since recharging the battery requires the overpotential needed to affect the oxidation of metal-oxygen compounds (for example, lithium peroxide) higher than the equilibrium potential for the reaction, other problems may arise. Such high potentials (often greater than one volt versus a standard hydrogen electrode) may create a highly reactive, oxidative environment that can damage the air electrode, battery solvent, electrolyte and/or other materials that make up the battery. Further complications may include that waste heat may be generated from this overpotential, creating an environment which is even more likely to promote unwanted side reactions, damaging the battery and/or shortening its useful life. It is due to such phenomena that high energy density metal-air batteries (such as lithium-air and sodium-air batteries) have not yet realized their full promise.

BRIEF DESCRIPTION OF SEVERAL VIEWS OF THE DRAWINGS

Specific examples have been chosen for purposes of illustration and description, and are shown in the accompanying drawings, forming a part of the specification.

DETAILED DESCRIPTION

Figure 1:
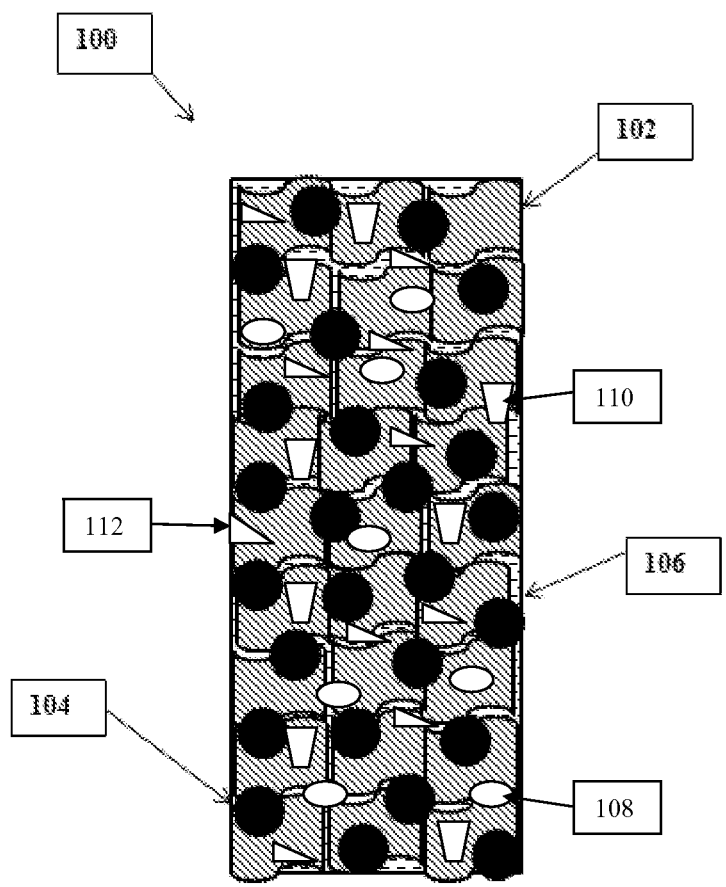
FIG. 1 illustrates one example of a dual use gas diffusion-gas evolution electrode of the present technology.

The present technology relates to novel electrodes for an electrolytic cell of a battery or fuel cell, and related electrolytic cells, and more particularly to dual use gas diffusion-gas evolution electrodes. Methods of making such electrodes and electrolytic cells of the present technology are also described.

Throughout this specification and the appended claims, the following terms have the meanings set forth as indicated below, which is believed to be consistent with how these terms would be understood by one of ordinary skill in the art:

Overpotential: The additional potential beyond the thermodynamic equilibrium required to drive a reaction at a certain rate. Overpotential is an absolute quantity, and is required to some degree for any electrode driving a reaction in either direction-oxidation or reduction.

Inner-sphere reaction: A reaction between an electrode and a species that has a strong interaction of the reactant intermediates or products with the electrode. Such reactions involve specific adsorption of species involved in the electrode reaction. An inner-sphere reaction could also involve a specifically adsorbed ion or ligand that serves as a ligand bridge to a metal ion.

Outer-sphere reaction: A reaction between an electrode and a species where the reactants and products do not interact strongly with the electrode surface. Such reactions are generally at a distance of at least a solvent layer away from the electrode.

Electrochemical cell: A complete electrochemical device, including two electrodes, reactants, electrolyte, solvent, and optionally a spacer, current collectors and catalysts, and a case.

SEI: Solution electrolyte interface, such as formed at the surface of an alkali metal electrode and a nonaqueous solvent.

Diamond-like carbon: a natural or synthetic diamond, and any other form of carbon having at least some of the properties of natural or synthetic diamond, such as $sp^3$ bonded carbon atoms. There are generally seven currently recognized forms of diamond-like carbon, including tetrahedral amorphous carbon (ta-C). Forms of diamond-like carbon differ in content with respect to amounts of $sp^3$ bonded carbon and graphitic $sp^2$ carbon, and may include hydrogen, nitrogen, metals and other fillers. Diamond-like carbon can be doped or un-doped.

Dual use gas diffusion-gas evolution electrodes of the present technology can include a conductive network of diamond-like carbon, and a catalyst. In at least some examples, the diamond-like carbon comprises greater than about 50% $sp^3$ bonded carbon atoms. The conductive network of diamond-like carbon has a thermal conductivity of at least about 1000 W/m·K. The catalyst can catalyze a desired reaction during at least one of oxidation or reduction. Electrodes of the present technology require an overpotential of at least 0.3 volts greater than that of conventional electrode materials, such as graphite, at a given current density for inner-sphere reactions.

During reduction, electrodes of the present technology act as gas diffusion electrodes. A gas diffusion electrode is an electrode that is designed so that gases may be used as reactants at the electrode, and non-participating gases (such as nitrogen in the air) can diffuse in and out, along with any product gases created, so as not to create a dead layer, blocking diffusion of the reactant gases. Throughout its volume, a gas diffusion electrode ideally has a balance of electrical, ionic(electrolyte) and gas access.

During oxidation, electrodes of the present technology act as gas evolution electrodes. A gas evolution electrode is an electrode that is designed with a high surface area, electrolyte access, and the provision for gases created at the electrode surface to easily escape from the electrode structure. Unlike a gas diffusion electrode, it does not require a structure such that non-reacting gases will be facilitated in diffusing in and out, in that the only requirement for gases in this electrode is their escape.

FIG. 1 illustrates one example of dual use gas diffusion-gas evolution electrode 100 of the present technology. Electrode 100 may include a conductive network of diamond-like carbon 102, which may comprise at least one catalyst 104. Depending upon the application, the conductive network of diamond-like carbon 102 may be connected to the electrochemically inert substrate 106. In some examples, the connection can be a result of the conductive network of diamond-like carbon 102 being formed on the electrochemically inert substrate 106. Alternatively, a dual use gas diffusion-gas evolution electrode 100 of the present technology may be in a porous structure on the surface of a solid electrolyte, where the solid electrolyte contacts the catalyst and electrically conductive network and is still available for gas access, allowing reduction of oxygen gas by ions in the electrolyte, and subsequent oxidation of the reduction products.

In some examples, the electrode may have a thickness that is from about 20 nanometers to about 5000 micrometers.

The insulating substrate 102 may be an electrochemically inert material suitable for use in a gas diffusion electrode. Some examples of suitable electrochemically inert materials may include, but are not limited to electrically non-conductive diamond, diamond like carbon or ta-C. The electrochemically inert substrate may have a thermal conductivity of at least about 1000 W/m·K.

The conductive network of diamond-like carbon 102 may further comprise additional components, such as one or more of the following: a binding agent 108, a wetting agent 110, or a de-wetting agent 112.

A binding agent may act to hold together the components of the network of diamond-like carbon 102. Some examples of suitable binding agents may include, but are not limited to polyethylene, epoxy, silicone or sintered polytetrafluoroethylene.

Whether the dual use gas diffusion-gas evolution electrode is made for use with an aqueous solvent and electrolyte or a non-aqueous solvent and electrolyte, a wetting agent may be included in the conductive network of diamond-like carbon 102. The wetting agent may be of a type and in an amount sufficient to facilitate contact between the network of diamond-like carbon and the solvent and electrolyte. In applications where the dual use gas diffusion-gas evolution electrode is made for use with an aqueous solvent and electrolyte, the wetting agent may be a hydrophilic material. Some examples of hydrophilic wetting agents may include, but are not limited to surfactant, cellulose fibers, silica particles, or sulfonated polystyrene.

Additionally, whether the dual use gas diffusion-gas evolution electrode is made for use with an aqueous solvent and electrolyte or a non-aqueous solvent and electrolyte, a de-wetting agent may be included in the conductive network of diamond-like carbon 102. The de-wetting agent may be of a type and in an amount sufficient to prevent flooding of the electrode. In applications where the dual use gas diffusion-gas evolution electrode is made for use with an aqueous solvent and electrolyte, the de-wetting agent may be a hydrophobic material. Some examples of hydrophobic wetting agents may include, but are not limited to Teflon™ suspensions, or polyethylene particles.

Alternatively, surface modification can be used as a pretreatment step to modify the surface of diamond like carbon directly. Such a pretreatment step, either through exposure to gases, plasmas, wet chemistry, electrochemically, or other methods, may change the functional groups exposed on the surface and change the wetting properties of the diamond like carbon. For example, the surface of the diamond like carbon could be hydroxyl terminated by pretreatment of the diamond like carbon in strong base beforehand, followed by washing with distilled water. This would have the effect of making the surface more hydrophilic. As another example, the surface of the diamond like carbon could be hydrogen terminated, by exposure to strong acid, or fluorine terminated by holding at a high electrochemical potential in a solution containing fluoride ions. Such treatments would render the surface more hydrophobic.

Electrochemical cells of the present technology may include a case, an electrolyte disposed within the case, and a dual use gas diffusion-gas evolution electrode within the case in contact with the electrolyte. In such examples where the electrode is placed (or created) against the separator of a cell containing liquid electrolyte, some electrolyte may be taken up by the conductive network by capillary action. Controlling the composition of the conductive network may prevent the electrolyte from flooding the entire free volume of the conductive network. When electrolyte will be taken up by the conductive network, a triple point of gas access, ionic access, and electrical access may form throughout a large portion of the volume of the conductive network. Gases, as reactants or products, may be free to diffuse into and out of the majority of the volume of the conductive network while ionic access to all or most of the electrically conductive parts and catalyst of the conductive network may also be allowed. This may allow for a large effective reaction surface in a relatively small volume. During operation as a gas diffusion electrode, the electrode must be open enough to accept reactant gases and move non-participating gas species along, via diffusion. During operation as a gas evolution electrode, the requirement for gas diffusion is eliminated, and the open, porous parts of the electrode may well be completely filled with reactants and electrolyte, provided there is a path for product gases to escape.

Figure 2:
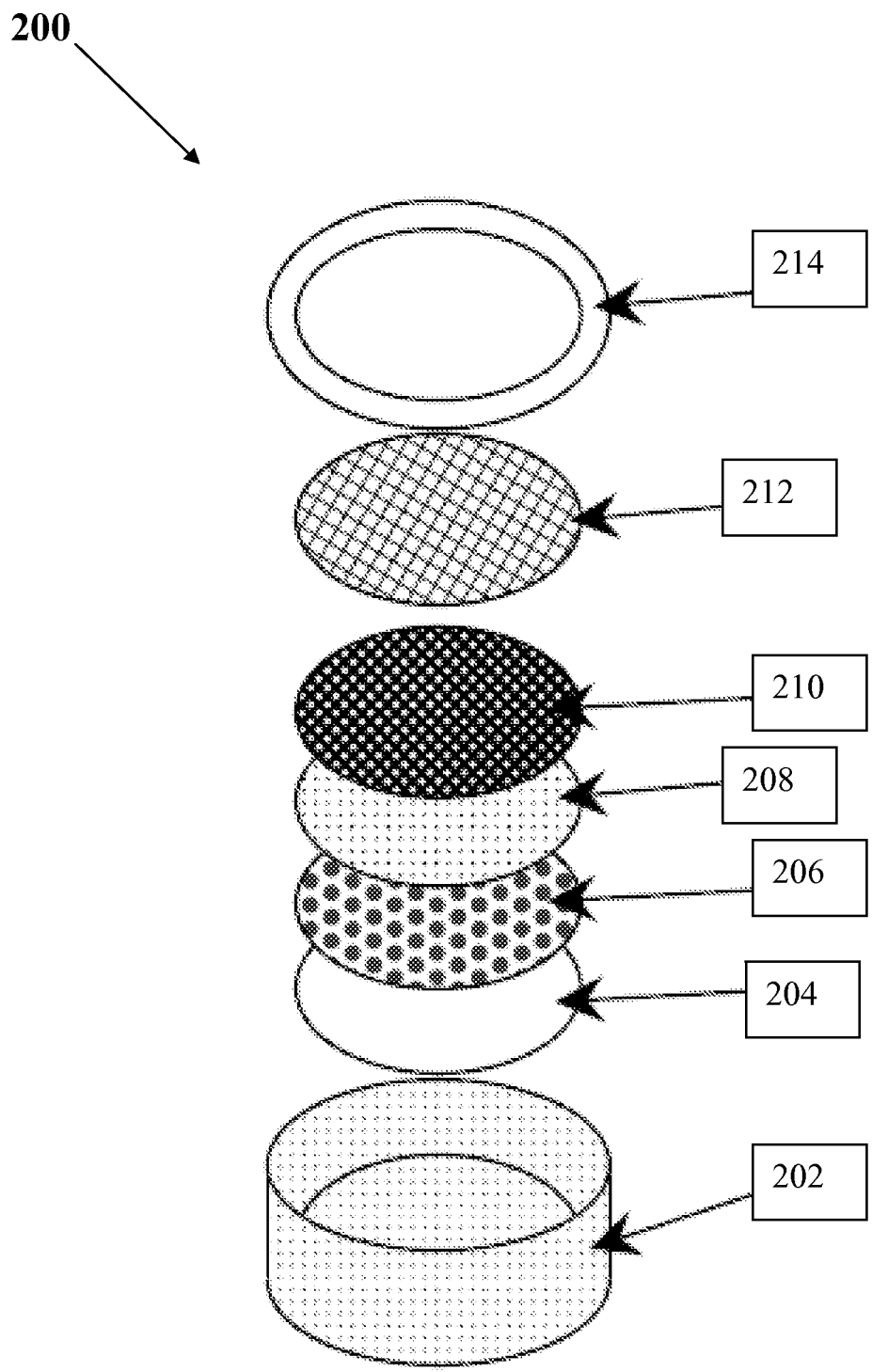
FIG. 2 illustrates an exploded view of one example of an electrochemical cell of the present technology.

FIG. 2 shows an exploded schematic of an example of an electrochemical cell 200 of the present technology, of a metal-air type. The cell case 202 may enclose the other components: the negative electrode current collector 204, the negative electrode 206, for example, a lithium metal foil disk. Above the negative electrode, a porous separator 208 may be placed on which the positive dual use gas diffusion-gas evolution electrode 210 has been fabricated. The other side of the separator 208 may be soaked in, and thus contains, solvent and electrolyte. A gas diffusion layer 212, such as a metal foam or conductive cloth, may be placed over the positive dual use gas diffusion-gas evolution electrode 210 so as to maintain sufficient contact force between all the components while also allowing sufficient gas and electrical access to the entire area of the dual use gas diffusion-gas evolution electrode 210. Such a gas diffusion layer must meet the requirement of not being wet with electrolyte to the point that it could participate in reactions, or, if wet, is coated in such a way as to have the same electrochemical characteristics as the gas diffusion electrode itself. For example, coated with diamond like carbon. A retaining ring 214 may be screwed into the case 202 to hold all of the components against each other. A dual use gas diffusion-gas evolution electrode 210 in contact with the solvent and electrolyte in separator 208, and maintained in such a case 202 constitutes a one electrode cell.

Figure 3A:
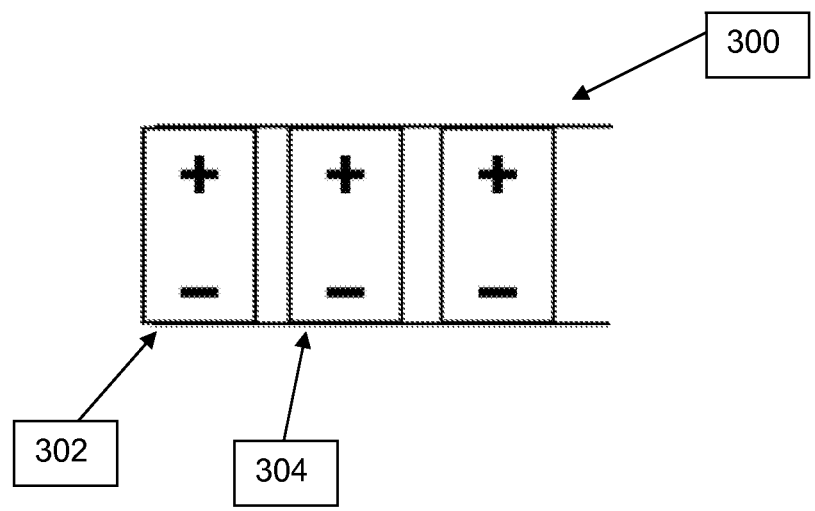
FIG. 3a illustrates one example of a battery of the present technology, with electrochemical cells connected in parallel.
Figure 3B:
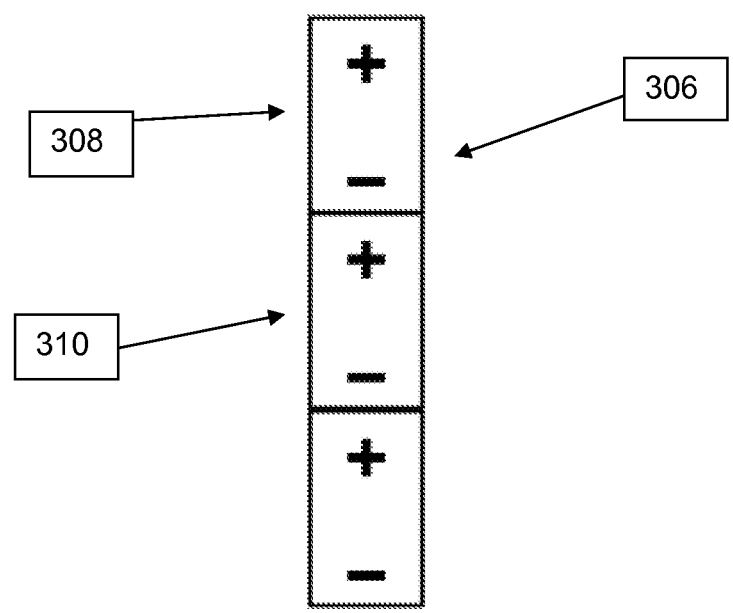
FIG. 3b illustrates one example of a battery of the present technology, with electrochemical cells connected in series.

Batteries using multiple electrochemical cells of the present technology in series or parallel may allow for changing the output potential and current to match various applications. As shown in FIG. 3a a battery 300 may include at least two electrochemical cells, such as electrochemical cells 302 and 304. The electrochemical cells may be electrically connected in parallel, as shown in FIG. 3a. Alternatively, a battery 306 may include at least two electrochemical cells 308 and 310, which may be electrically connected in series, as shown in FIG. 3b.

Diamond-Like Carbon

The diamond-like carbon for use in the present technology may be doped or synthesized in a manner to give a predetermined conductivity. In some examples discussed further below, the diamond-like carbon may be doped. For example, the diamond-like carbon may be boron doped diamond, or boron doped diamond-like carbon. In other examples, other doping agents can be used, including but not limited to nitrogen.

Diamond-like carbon of the present technology may be in the form of particles. In some examples, the particles may have a size from about 1 micrometer to about 2000 micrometers. In other examples, the particle size may be about 10 nanometers or greater.

Diamond-like carbon of the present technology may be a robust material for use in electrodes in harsh electrochemical environments (i.e., kinetically stable under harsh conditions, such as fluorine evolution). In some examples, the diamond-like carbon may have a dissolution rate lower than that of a noble metal. For example, values reported for electrochemical oxidative dissolution of boron-doped diamond are typically below 0.5 µg/Ampere·hour in sulfuric acid solutions, comparing favorably with noble metals such as platinum, gold and iridium, which are on the order of from 1 to 10 µg/Ampere·hour. As another example, examples of platinum dissolution upon potential cycling in 0.5M sulfuric acid can be as high as 130 mg/Ah, and examples of platinum dissolution under galvanostatic oxidative conditions in 0.1M sulfuric acid, have been known to range from 30 to 70 µg/Ah. In contrast, boron doped diamond has a typical dissolution rate of 0.3 µg/Ah in 1.3M sulfuric acid. This property may allow the diamond-like carbon to weather the harsh environment of a metal-air battery electrode, even when re-charging such a battery requires high positive overpotentials to affect the reaction.

Diamond-like carbon of the present technology may also require a high overpotential for inner-sphere reactions. In other words, the diamond-like carbon may have a wide electrochemical "window" in most solvents, meaning that the diamond-like carbon does not facilitate the breakdown of a solvent or electrolyte by electrochemical means. This may be due to the extraordinary inertness of the diamond-like carbon of the present technology towards inner-sphere electrochemical reactions. As a consequence, while the catalyst of the electrode facilitates the desired reaction, unwanted side reactions may be less likely to occur because the diamond-like carbon may not facilitate any other inner-sphere reactions.

Figure 4:
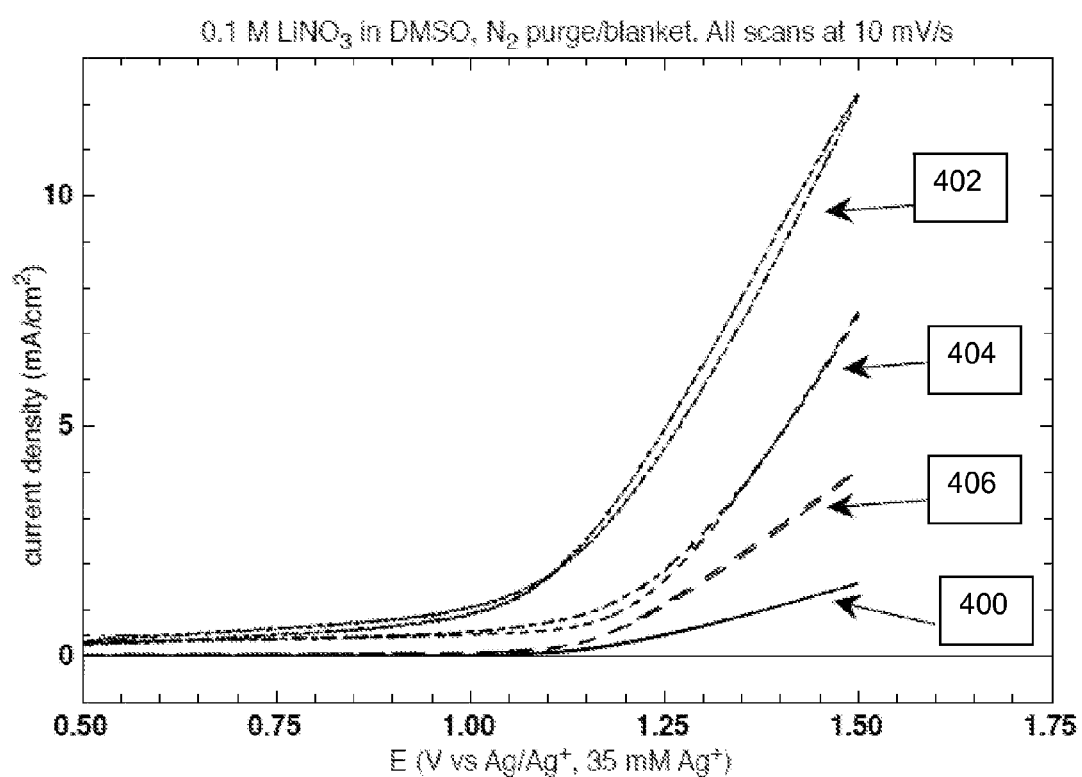
FIG. 4 shows cyclic voltammograms of graphite, platinum, glassy carbon and boron-doped diamond electrodes in 0.1 M lithium nitrate in dimethyl sulfoxide.

For example FIG. 4 is a cyclic voltammogram, demonstrating the high breakdown voltage and low current density for boron doped diamond (400) in a system containing an electrolyte of lithium nitrate in dimethyl sulfoxide, which has been used as a model system for the positive electrode in lithium-oxygen batteries. As shown, the boron doped diamond has a 5 to 50 times lower current density for a given potential than any of the illustrated typical electrode materials: graphite (402), platinum (404), and glassy carbon (406). This demonstrates that boron-doped diamond does not facilitate unwanted side reactions when operating at such potentials in the system, and may be directly applicable to prolonging the service life of a metal/air battery that uses this solvent/electrolyte system.

Indeed, an electrode using diamond-like carbon of the present technology may require an overpotential that is greater than that of commonly used electrode materials at a given current density for inner-sphere reactions, including for any of the various types of inner-sphere reactions. For example, all solvents (including water) used in electrochemical applications may break down, that is, may be oxidized or reduced to another species if an appropriately high or low potential is applied to an electrode. This is known as solvent breakdown, and the potential required to perform this is known as the breakdown potential.

In some examples, the diamond-like carbon of the electrode may require an overpotential of at least 0.3 volts (V) greater than that of commonly used electrode materials, such as graphite, at a given current density for inner-sphere reactions. Additionally, organic solvents, such as acetonitrile, may be chemically and electrochemically oxidized in the presence of oxygen, and oxygen containing species, to carbon and nitrogen oxides. Likewise, electrolytes such as tetrabutylammonium tetrafluroborate may be electrochemically oxidized to carbon and nitrogen oxides as the tetrabutylammonium ion is oxidized. Ammonium chloride may also be oxidized to chlorine gas. Accordingly, the diamond-like carbon of the present technology may have an overpotential of 0.3V or greater than that of commonly used electrode materials, such as graphite, at a given current density towards oxidation of solvents or electrolytes by oxygen, peroxide, hydroxide, or superoxide.

Figure 5:
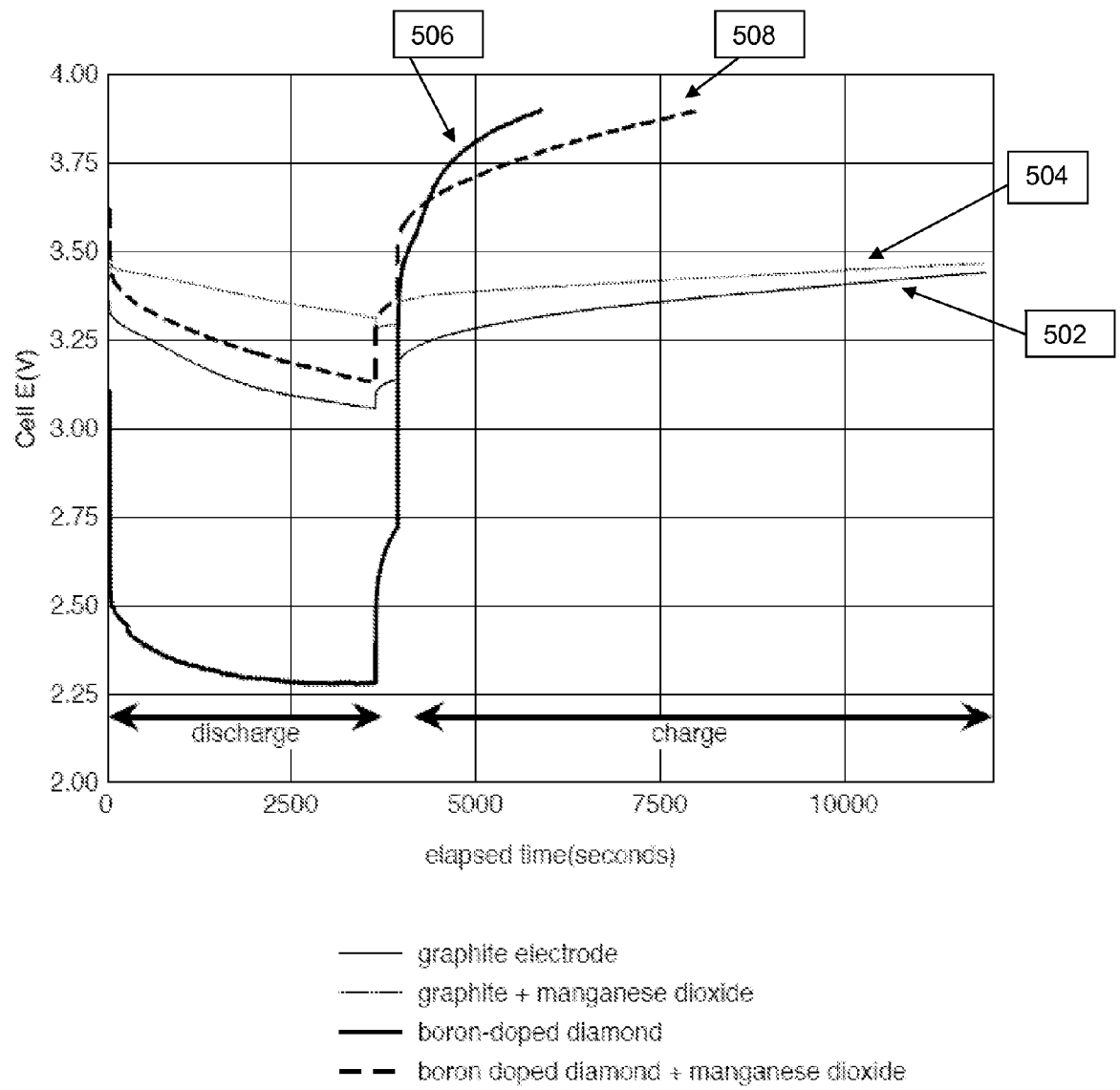
FIG. 5 is a graph of the cell voltage over time of examples of lithium air electrochemical cells during charge and discharge.

FIG. 5 is a graph illustrating the overpotential of one embodiment of diamond-like carbon of the present technology as compared to graphite. Specifically, FIG. 5 illustrates the function of four lithium air electrochemical cells having electrodes comprising the following materials: (1) graphite, (2) graphite with manganese dioxide ($MnO_2$) catalyst, (3) boron doped diamond of the present technology, and (4) boron doped diamond of the present technology with manganese dioxide catalyst. All of the cells used 0.1M LiNO3 as an electrolyte in tetraethylene glycol dimethyl ether solvent. The first part of the graph shows the discharge of 4 different cells, with each cell starting with an open circuit potential between about 3.1V and 3.6V. The resultant lines for each of the electrodes are shown in FIG. 5 as follows: (1) graphite is shown by line 502, (2) graphite with manganese dioxide catalyst is shown by line 504, (3) boron doped diamond of the present technology is shown by line 506, and (4) boron doped diamond of the present technology with manganese dioxide catalyst is shown by line 508.

As can be seen from line 506, immediately upon discharge, the cell comprising the boron doped diamond electrode experiences an overpotential of over 0.6V, underscoring the sluggish kinetics that BDD exhibits towards almost all electrochemical reactions (inner sphere reactions). Additionally, as shown by line 508, the cell that had both boron doped diamond and manganese dioxide catalyst experienced an overpotential of approximately 0.2V immediately upon discharge, showing that the manganese dioxide catalyst is indeed improving the reaction kinetics of oxygen reduction with lithium ion to lithium peroxide (Li2O2) in this cell configuration. The cell of line 508 also shows a marked increase (improvement) over the cell of line 506 for the duration of discharge, with a cell potential about 0.9V higher than the latter for the duration of discharge, clearly illustrating that while the boron doped diamond alone does not itself promote reactions, it also does not impede the function of the catalyst in promoting the desired reaction of oxygen reduction with lithium ion. As can be seen by line 502, the cell having graphite only for its air electrode showed a very small overpotential (<0.1V) upon discharge, even less than the electrode associated with line 508, suggesting that graphite, while not a specific catalyst for oxygen reduction, is also providing a pathway for side reactions to occur in the cell that are not specific to oxygen reduction with lithium ion, such as the oxidation of the solvent and electrode itself As can be seen by line 504, the cell having graphite and manganese dioxide catalyst showed an almost imperceptible overpotential upon discharge (<0.05V), and an increase (improvement) in discharge potential for the duration of discharge over that of graphite only (line 502). But, the difference is only about a 0.2V improvement, whereas the discharge potential increase with the boron doped diamond and catalyst (line 508) was about 0.8V.

Upon recharging, the same effects can be seen. The electrode comprised of boron doped diamond alone (line 506) shows the highest overpotential and the fastest time to the upper potential limit of charging, 3.9V. The electrode of line 508 shows a much longer recharge duration and lower overpotential. The two electrodes containing graphite (lines 502 and 504) show potentials below 3.5V for a long duration, far below the potential region expected to be needed for the oxidation of Li2O2, the desired reaction, strongly suggesting that the graphite enables side reactions, such as the oxidation of the graphite electrode itself and oxidation of the solvent.

Because solvent breakdown, electrolyte decomposition, and oxidations involving gaseous oxygen may be inner-sphere, multi-step reactions, electrodes of the present technology may protect the solvent, electrolytes, and materials used to make the device. The effect of this may be to increase the device's lifetime by preventing side reactions that will compromise other cell materials and components.

Further, diamond-like carbon of the present technology may have a high isotropic thermal conductivity, and thus may prevent overheating on discharge and especially recharging. Diamond-like carbon of the present technology may have over four times the thermal conductivity of copper or silver, particularly when the diamond-like carbon is boron doped. As stated above, in electrodes of the present technology, the conductive network of diamond-like carbon has a thermal conductivity of at least about 1000 W/m·K. In some embodiments, the conductive network of diamond-like carbon may have a thermal conductivity of at least about 2000 W/m·K. In some examples, single crystal diamond may have a thermal conductivity in excess of 2,200 W/m·K, and some synthetic diamonds may exhibit even higher isotropic thermal conductivity.

In metal-air battery applications, the overpotentials required to recharge the metal-air battery cause waste heat to manifest on the air electrode, and dissipating it can protect cell materials and components from unwanted side reactions, which may be far more likely to occur at higher temperatures. Diamond-like carbon of the present technology used as the electrically conductive network in the electrode, may remove waste heat from the exact point at which the heat is generated, where the electrons, ions, and gas come together. Since the reduction of oxygen, and the oxidation of peroxide at room temperature, for example, both come with significant overpotentials, more efficient removal of waste heat due to these reaction overpotentials may allow for faster charging and discharging rates or current densities.

Likewise, the thermal stability of diamond-like carbon of the present technology at high temperature may be advantageous in enhancing cell cycle life, discharge rate, and safety. Present day, large high-discharge-rate battery pack designs typically require liquid or air cooling systems to maintain operating temperature below a certain limit (e.g. less than 75° C.) to ensure safety, and reduce cell degradation. Electrochemical cells of the present technology do not promote side reactions at elevated temperatures, and may therefore be safer at higher temperatures. It may be possible to reduce or eliminate cooling system requirements for high charge and discharge rates.

Some examples of diamond-like carbon can typically have low electrical conductivity in their pure form. In order to achieve acceptable conductivity, dopants such as nitrogen and/or boron may be added. Doping may allow for the diamond-like carbon material to be used for electrochemical purposes, and still maintains the high overpotential for inner sphere reactions discussed herein. Changing the dopants or the dopant level in the diamond-like carbon may tune the properties of the electrode such that reactions above or below a desired potential range will become more sluggish. This may be useful in creating an electrode that will be less likely to engage in unwanted reactions, and may be desirable in prolonging the life of electrochemical cells and systems. In the case of tetrahedral amorphous carbon, for example, nitrogen doping levels of up to about 10%, including for example from about 5% to about 10%, may be used to increase conductivity. In the case of boron, doping levels from about 100 to about 10,000 parts per million (ppm), including for example from about 500 to about 5,000, parts per million may be used to achieve near metallic type conductivity. Boron doping levels above about 5000 ppm may compromise the crystal structure of the diamond-like carbon, possibly resulting in graphitic content that is neither electrochemically robust nor has an acceptably high overpotential for unwanted reactions. Doping the diamond-like carbon with lower levels of boron, of about 100 to 500 ppm, may result in an acceptably conductive electrode that, due to the acceptor level of boron in the crystal, may be less likely to engage in unwanted reactions above or below a desired redox potential.

Catalyst

Electrodes of the present technology may comprise at least one catalyst, and may use mixtures of two or more catalysts. A catalyst may be included in the electrode to facilitate one or more desired reactions. When catalyst is added to the surface of an electrode to facilitate particular desired reactions, it may be desirable that the selected catalyst does not also facilitate unwanted reactions, such as solvent breakdown and electrolyte breakdown. For example, in certain applications, such as when used as the air electrode in a metal-air battery, electrodes of the present technology may include a catalyst that aids in the reduction of oxygen gas, and the oxidation of peroxides, hydroxides, oxides, or superoxides. An example of such a catalyst is manganese dioxide, which, when included in an electrode of the present technology, may facilitate both the reduction of oxygen to peroxide, and the subsequent oxidation of peroxide to oxygen.

Electrodes and Electrochemical Cells

Dual use gas diffusion-gas evolution electrodes of the present technology, and electrochemical cells using gas diffusion-gas evolution electrodes of the present technology, may be made in a number of ways.

For example, an electrode may be made on a suitably inert substrate, such as substrate 106 of FIG. 1, by depositing diamond-like carbon, and codepositing at least one catalyst. The materials to be deposited may be incorporated in a formulation as an ink, powder or spray, further comprising wetting and de-wetting agents. The electrode formulation may also include a pore forming agent that would work by evaporating, flowing or sublimating to leave voids in the final structure. In addition, a material, such as lithium peroxide, can be included in the electrochemical cell in discharged state, which, upon first charging, will create the desired porous structure.

Such an electrode may be made by, amongst other methods, screen printing, decal transfer, or spray techniques. Additional diamond-like carbon or other conductive materials may be added to the formed electrode, along with additional catalysts if necessary. Additional treatment of the electrode by wetting or de-wetting agents may also be conducted.

Figure 6:
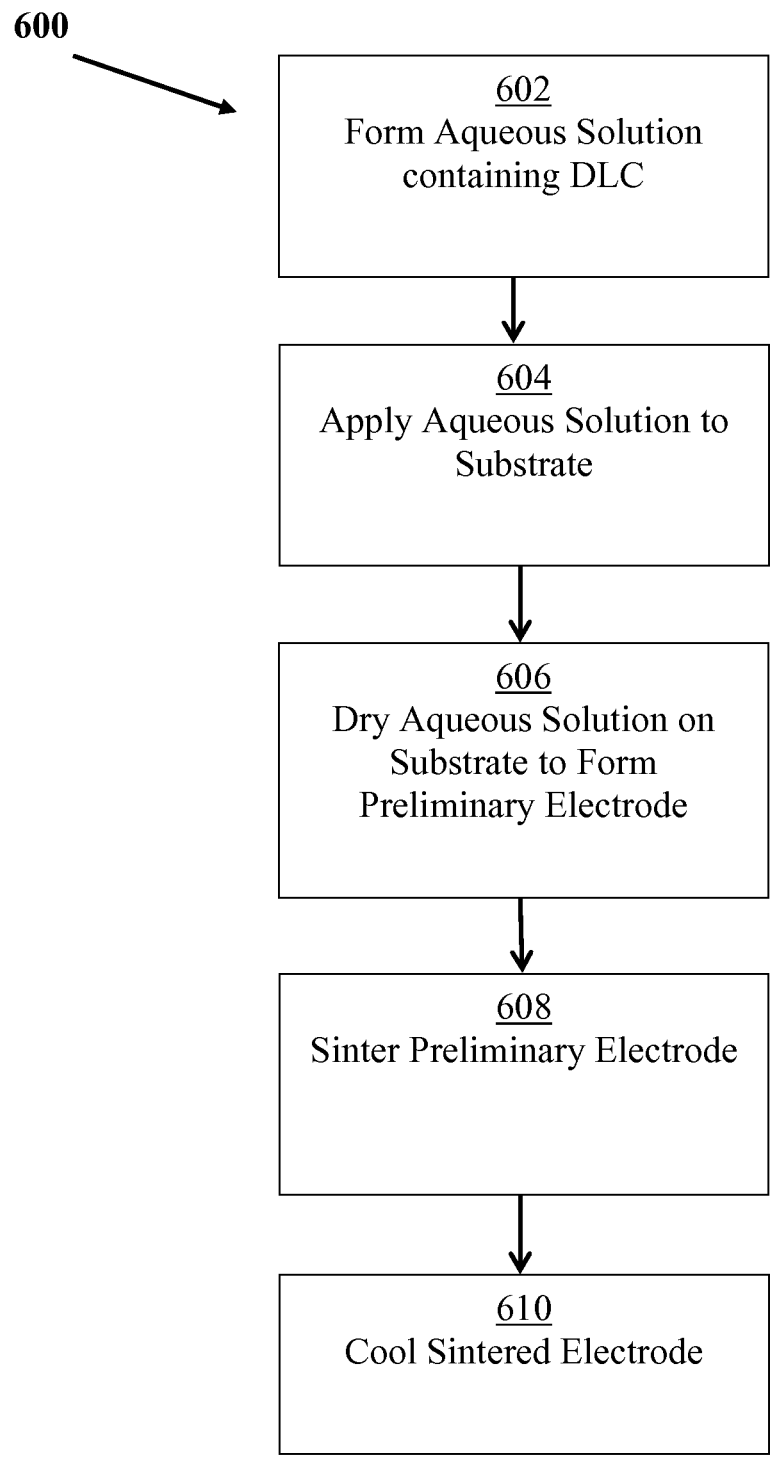
FIG. 6 is a flow chart of one method of making a dual use gas diffusion-gas evolution electrode of the present technology.

Example: Formation of a Gas Diffusion-Gas Evolution Electrode and Electrochemical Cell The flow chart in FIG. 6 illustrates one method 600 of making gas diffusion-gas evolution electrodes with diamond-like carbon of the present technology. The illustrated method 600 starts at step 602, with formation of an aqueous suspension containing diamond-like carbon, catalyst, binder, and any other desired components. For example, a pore forming agent, such as, naphthalene powder, may be added to the formulation such that upon sintering it sublimes, melts, or evaporates, leaving voids in the electrode which will then allow for gas access. At step 604, the aqueous suspension may be applied to a substrate such as a porous separator, or a thick sheet of PTFE which has been coated with a release agent, then allowed to dry at step 606 to form the preliminary electrode. After drying 606, the preliminary electrode may be sintered at step 608 in an oven such that the PTFE melts and flows, acting as a binder for the electrode and catalyst particles. The sintering step may include application of a nitrogen purge. At step 610, the formed electrode may be allowed to cool.

In one example of the method 600, at step 602, the aqueous suspension was formed by mixing 2 grams of 20μm boron doped diamond powder, 0.5 grams of 20 μm manganese dioxide powder, 0.5 grams of PTFE Aqueous Dispersion, 0.2 grams of naphthalene power, and 2 grams of distilled water in a small beaker by magnetic stirrer for 5 minutes. At step 604, the aqueous suspension was coated onto 3 mm thick PTFE sheet with a 50 μm doctor blade. At drying step 606, the coated PTFE sheet was placed into oven at 125° C. for 20 minutes. At the sintering step 508, nitrogen purge was applied to the oven, and the temperature was raised to 270° C. and held for 30 minutes. Then, the temperature was raised to 350° C. and held for 20 minutes. The oven was then turned off, while nitrogen purge continued. When the oven reached 80° C., the cooling step 610 was performed by removing the formed electrode from the oven and allowing it to cool to room temperature.

One way in which a dual use gas diffusion-gas evolution electrode formed in accordance with FIG. 6 may be incorporated into an electrochemical cell is by pressing and transferring it, with heating if desired, onto a desired substrate, such as a polyethylene battery separator, in a decal type fashion.

In an alternative method, the aqueous suspension may be sprayed onto a heated or unheated substrate at room temperature or at an elevated temperature. When the suspension is supplied at an elevated temperature, the act of spraying the suspension onto the substrate may create a porous continuous gas diffusion electrode structure due to evaporation of solvent. A sintering step afterwards, for example, in an oven, may allow for the PTFE in the suspension or another binder to fully spread in the matrix and create a desired binding and wetting characteristic to the electrode.

Example: Construction of a Li-Air Battery Cell

A lithium-air battery cell including a dual use gas diffusion-gas evolution electrode of the present technology, including diamond-like carbon and manganese dioxide was constructed using the following materials:

1 54×54×6 mm polyethylene square with a 24 mm×32 mm×750 micron deep milled rectangle in the center, a 12 mm-wide hole in the center, and two screws on either side (bottom piece)

1 54×54×6 mm polyethylene square with a 20×20 mm hole in the center and two 3.5 mm-wide holes on either side (middle piece)

1 54×12×6 mm polyethylene rectangle with 2-4 mm wide holes on each side and a pin through the center (top piece)

1 15 mm-diameter, 250 micron thick lithium metal disk 1 24×32 mm rectangle of copper metal, 50 microns thick.

1 20×20 mm rectangle of porous doped silicon wafer, coated with boron doped diamond 1 54×54 mm square of polyethylene, with a 25×25 mm hole in the center 1 square of filter paper 25×25 mm, 900 μm thick 200 mg of 15 μm diamond like carbon particles +20 mg of 1 μm diameter manganese dioxide particles ⅜-inch NPT plug and spring 2 springs 4 nuts First, the rectangle of copper metal was placed on the bottom polyethylene piece, in the milled square depression. Next, the polyethylene square was placed on the bottom piece, through the screws. The intermediate assembly was placed in a dry box, and the dry box was sealed and flushed out with argon gas to prevent any reactions during the rest of the assembly process. Using tweezers, the lithium disk was placed on top of the copper metal rectangle. The filter paper was then placed on the lithium disk, as a separator. The middle polyethylene piece of the cell was then placed on top of the filter paper. Using a 1 mL syringe, 300 μL of solvent with electrolyte was applied onto the filter paper separator, covering the entire surface exposed by the 20×20 mm hole in the center of the middle polyethylene piece. The DLC and MnO2 particles were then poured onto the filter paper separator and spread evenly across the exposed surface. The porous, doped diamond coated silicon current collector was then placed on top of the electrode particles, sitting flat and pressed down slightly to ensure even contact. Two nuts were used on the screws to tighten and secure the assembly. The top 50×12×6 mm polyethylene piece with center pin was then placed over the assembly. One spring was then placed on each screw, and a nut was secured on each such that the springs were slightly compressed. The NTP plug and spring were then screwed into the bottom of the cell, finger-tight. The dry box was then opened, and air was allowed to waft onto the finished cell to initiate operation.

Example: Use of Utility of Dual Use Gas Diffusion-Gas Evolution Electrodes

Figure 7:
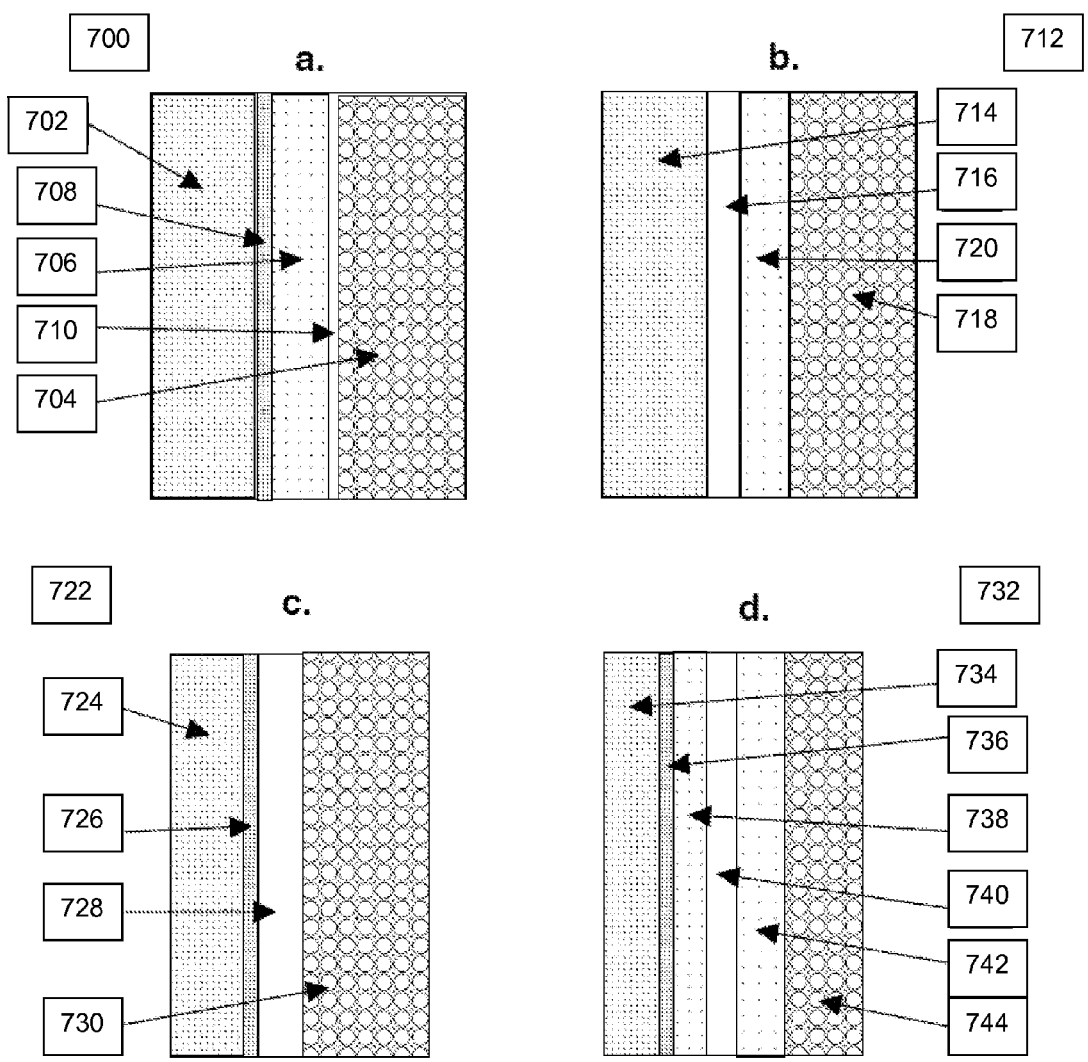
FIG. 7 shows examples of electrochemical cells incorporating a dual use gas diffusion-gas evolution electrode of the present technology.

FIG. 7 illustrates different types of electrochemical cells in which dual use gas diffusion-gas evolution electrodes of the present technology may be used.

FIG. 7a shows an aprotic lithium oxygen cell 700. During discharge, the lithium metal negative electrode 702 is oxidized to release lithium ions. These ions then migrate to the positive electrode 704, which is a dual use gas diffusion-gas evolution electrode of the present technology, and react with gaseous oxygen to form insoluble lithium peroxide. Upon recharging, the lithium peroxide on the positive electrode 704 is oxidized to oxygen gas, and the lithium ions migrate to the negative electrode 702, where they are reduced to lithium metal. This battery uses a solvent/electrolyte 706, including a polar, aprotic solvent such as dimethyl sulfoxide, along with an electrolyte such as tetramethyl ammonium hexafluorophosphate. An SEI 708 develops between the lithium metal negative electrode and the contacting electrolyte. A porous separator 710 is soaked in electrolyte and prevents electrical contact between the two electrodes. In the context of this type of battery, in contrast to graphite, carbon black or graphite powder, the diamond-like carbon of the present technology will not be attacked by lithium peroxide, nor facilitate any reactions between the lithium peroxide and any other materials in the battery, being impervious to charging potentials and not facilitating any electrochemical oxidation of the cell parts, solvent or electrolyte.

FIG. 7b shows an aqueous lithium oxygen cell 712. During discharge, the lithium metal negative electrode 714 is oxidized to release lithium ions. These ions then migrate through a selective lithium ion permeable membrane 716 to the positive electrode 718, which is a dual use gas diffusion-gas evolution electrode of the present technology, and where they react with gaseous oxygen to form soluble lithium hydroxide. On recharge, the lithium hydroxide on the positive electrode 718 is oxidized to oxygen gas, and the lithium ions migrate through the selective lithium ion permeable membrane 716 to the negative electrode 714, where they are reduced to lithium metal. This battery uses water as a solvent along with a an electrolyte such as lithium nitrate 720. In the context of this aqueous battery, the diamond-like carbon of the present technology can have a wide potential window in water, and can protect the battery from solvent breakdown. Water has a much smaller electrochemical potential window than other solvents, and the ability to extend this and prevent breakdown can be of greater importance and concern, as opposed to nonaqueous solvents which can have much wider electrochemical potential windows.

FIG. 7c shows a solid state lithium oxygen cell 722. During discharge, the lithium metal negative electrode 724 is oxidized to release lithium ions. These ions then migrate across an artificial SEI 726 through a solid lithium ion permeable electrolyte 728 to the positive electrode 730, which is a dual use gas diffusion-gas evolution electrode of the present technology, where they react with gaseous oxygen to form insoluble lithium peroxide. Upon recharging, the lithium peroxide on the positive electrode 730 is oxidized to oxygen gas, and the lithium ions migrate through the solid lithium ion permeable electrolyte 728 to the negative electrode 724, where they are reduced to lithium metal. This battery uses a solid electrolyte and requires no solvent. Solid electrolytes, such as those used in this type of battery, require a much higher overpotential to re-charge, and thus raise the potential of the air electrode to potentials that will oxidize all but the most robust materials. Thus, in the context of this type of solid state lithium oxygen battery, the diamond-like carbon of the present technology can provide the advantages of both electrochemical robustness and excellent thermal conductivity, which can be useful to remove waste heat from the battery generated by the high overpotential required on recharge.

FIG. 7d shows a mixed aprotic/aqueous lithium oxygen cell 732. Its behavior and function has attributes of both of the first two types described in FIGS. 7a and 7b. During discharge, the lithium metal negative electrode 734 is oxidized to release lithium ions. These ions then migrate across an SEI 736 through an aprotic solvent/electrolyte 738, through a selective lithium ion permeable membrane 740, through an aqueous or protic solvent and electrolyte, such as lithium nitrate in water 742 to the positive electrode 744, dual use gas diffusion-gas evolution electrode of the present technology, where they react with gaseous oxygen to form soluble lithium hydroxide. Upon recharging, the lithium hydroxide on the positive electrode 744 is oxidized to oxygen gas, and the lithium ions migrate back through the aqueous or protic electrolyte 742, through the selective lithium ion permeable membrane 740, through the aprotic solvent and electrolyte 738 to the SEI 736 and finally to the negative electrode 734, where they are reduced to lithium metal. This battery uses a polar, aprotic solvent such as dimethyl sulfoxide, along with an electrolyte such as tetramethyl ammonium hexafluorophosphate on the negative side of the membrane, and water as a solvent along with a an electrolyte such as lithium nitrate on the positive side. In a mixed aprotic/aqueous lithium oxygen battery, the diamond-like carbon of the present technology can have a wide potential window in water, and can protect the battery from solvent breakdown.

Making Diamond-Like Carbon

Diamond-like carbon may be made in several ways. One of the most common is argon sputtering of a graphite target in a vacuum chamber onto a substrate that may be electrically biased at 30 to 100 volts below that of the sputtering source. Nitrogen or other dopants may be incorporated as gases in the chamber or as solid materials that are co-sputtered with the graphite. The films may be smooth down to molecular levels and may range from nanometers to microns thick, although films that are over a micron thick may be stressed and prone to cracking off of the substrate. The $sp^3$ character of such materials may range from 30 to 70% of the carbon bonds in the material, and may be verified by Raman spectroscopy.

Tetrahedral Amorphous Carbon may be made by Filtered Cathodic Vacuum Arc. Carbon ions may be made in an electrical arc with a striker and arc supply, and the ions are moved through a curved path by a magnetic and electric field. These may filter out uncharged species. The ions hit a substrate, typically biased at 80 to 100 volts below that of the source. Nitrogen may be added as a dopant by creating an ionized nitrogen beam by means of a discharge chamber in the vacuum chamber. Typical film thicknesses are similar to diamond-like carbon, and $sp^3$ content of the films may be between 80% and 100%, typically 85-87% $sp^3$ content. The undoped films are mildly p-type, but incorporation of 7-12% nitrogen results in a metallic type conductivity.

Boron doped diamond may be made by Chemical Vapor Deposition (CVD). A substrate, such as silicon, may be seeded with nano-diamond seed crystals, and placed in the reactor. The reactor may be heated to 600° C. to 900° C. and filled with a gas mixture containing about 99% hydrogen, 1% methane and a boron source, such as tripropyl borate. The gases may be broken into atomic fragments by either a microwave plasma (lower temperatures, nearer to 600° C.) or hot tungsten filaments (higher chamber temperatures required, closer to 900° C.). The methyl fragments may start depositing on the substrate and seed crystals. The large excess of hydrogen and hydrogen radicals may break up any $sp^2$ bond formation and may allow only $sp^3$ bonds to persist, resulting in a film composed of diamond crystals several microns in size. Incorporation of boron up to about 2000 ppm may result in a metallic like conductivity, due to the p-type boron being incorporated into the crystal structure to such an extent that it produces a degeneracy of states in the band structure of the crystals, enabling conduction at all energy levels. As with other types of diamond-like carbon, the $sp^3$ character of boron doped diamond may be verified by Raman spectroscopy. Lower boron doping concentrations (e.g., below about 500 ppm) may create a deficit of carrier states in the electrochemical potential region below about 0.3V as compared to a standard hydrogen electrode. Typical reactor pressures may be on the order of 1 to 20 torr. A variation of reactor gas composition, namely methane in a large excess of argon (more than 99% argon) may result in nanocrystalline films, with crystallites below 1 micron in size. Such films, even when undoped, may be electrically conductive. The mechanism for conduction in such films may be $sp^2$ bonding domains along the grain boundaries.

From the foregoing, it will be appreciated that although specific examples have been described herein for purposes of illustration, various modifications may be made without deviating from the spirit or scope of this disclosure. Additionally, the foregoing description of various embodiments includes some discussions of theories of operation. While these discussions include physical and/or chemical mechanisms that are believed to govern the operation of the embodiments, the invention should not be construed to be limited to embodiments governed by the particular mechanisms described. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. A dual use gas diffusion-gas evolution electrode comprising:
   a conductive network of diamond-like carbon, the conductive network of diamond-like carbon comprising a catalyst that catalyzes a desired reaction during at least one of oxidation or reduction;
   wherein the diamond-like carbon requires an overpotential of at least 0.3 volts greater than graphite at a given current density for inner-sphere reactions; and
   the conductive network of diamond-like carbon has a thermal conductivity of at least about 1000 W/m·K.

2. The gas diffusion-gas evolution electrode of claim 1, further comprising an electrochemically inert substrate; wherein the conductive network of diamond-like carbon is attached to the electrochemically inert substrate.

3. The gas diffusion-gas evolution electrode of claim 2, wherein the electrochemically inert substrate has a thermal conductivity of at least about 1000 W/m·K.

4. The gas diffusion-gas evolution electrode of claim 1, wherein the conductive network of diamond-like carbon further comprises a binding agent that holds together components of the conductive network of diamond-like carbon.

5. The gas diffusion-gas evolution electrode of claim 1, wherein the network of diamond-like carbon further comprises a wetting agent that facilitates contact between the network of diamond-like carbon and a solvent.

6. The gas diffusion-gas evolution electrode of claim 4, wherein the wetting agent is a hydrophilic material.

7. The gas diffusion-gas evolution electrode of claim 1, wherein the network of diamond-like carbon further comprises a de-wetting agent sufficient to prevent flooding of the electrode.

8. The gas diffusion-gas evolution electrode of claim 7, wherein the de-wetting agent is a hydrophobic material.

9. The gas diffusion-gas evolution electrode of claim 1, wherein the diamond-like carbon is doped with a dopant that increases the electrical conductivity of the diamond-like carbon.

10. The gas diffusion-gas evolution electrode of claim 1, wherein the diamond-like carbon is doped with boron at a concentration from about 100 ppm to about 10,000 ppm.

11. The gas diffusion—gas evolution electrode of claim 10, wherein the diamond-like carbon is doped with boron at a concentration of at least 1000 ppm.

12. The gas diffusion-gas evolution electrode of claim 1, wherein the catalyst catalyzes oxygen reduction and oxidation of at least one reduction product of oxygen selected form the group consisting of peroxides, hydroxides, oxides, and superoxides.

13. The gas diffusion-gas evolution electrode of claim 12, wherein the catalyst is manganese dioxide.

14. The gas diffusion-gas evolution electrode of claim 1, wherein the electrode has a thickness from about 20 nanometers to about 5000 micrometers.

15. The gas diffusion-gas evolution electrode of claim 1, wherein the network of diamond-like carbon comprises diamond-like carbon particles having a size from about 1 micrometer to about 2000 micrometers.

16. The gas diffusion-gas evolution electrode of claim 1, wherein the conductive network of diamond-like carbon has a thermal conductivity of at least about 2000 W/m·K.

17. The gas diffusion-gas evolution electrode of claim 1, wherein the diamond-like carbon has a dissolution rate lower than that of a noble metal in sulfuric acid.

18. An electrochemical cell comprising:
   a case;
   an electrolyte disposed within the case; and
   a dual use gas diffusion-gas evolution electrode within the case in contact with the electrolyte; the dual use gas diffusion-gas evolution electrode comprising:
      a conductive network of diamond-like carbon, the conductive network of diamond-like carbon comprising a catalyst that catalyzes a desired reaction during at least one of oxidation or reduction;
      wherein the diamond-like carbon requires an overpotential of at least 0.3 volts greater than graphite at a given current density for inner-sphere reactions; and the conductive network of diamond-like carbon has a thermal conductivity of at least about 1000 W/m·K.

19. A battery comprising at least two electrochemical cells of claim 18, the at least two electrochemical cells being electrically connected.

\* \* \* \* \*